United States Patent [19]

Åsberg

[11] Patent Number: 4,558,885
[45] Date of Patent: Dec. 17, 1985

[54] HUB BEARING UNIT HAVING A BALL JOINT

[75] Inventor: Sture Åsberg, Göteborg, Sweden

[73] Assignee: SKF Nova AB, Göteborg, Sweden

[21] Appl. No.: 545,923

[22] Filed: Oct. 27, 1983

[30] Foreign Application Priority Data

Nov. 26, 1982 [SE] Sweden ............................ 82026751

[51] Int. Cl.$^4$ ............................................ B60B 35/00
[52] U.S. Cl. ...................................... 280/674; 280/96.3
[58] Field of Search ..................... 280/674, 96.3, 105

[56] References Cited

U.S. PATENT DOCUMENTS

| | | | |
|---|---|---|---|
| 1,706,556 | 3/1929 | Wright | 280/96.3 |
| 3,295,626 | 1/1967 | Cadiou II | 280/96.3 |
| 3,492,018 | 1/1970 | Burckhardt et al. | 280/674 |

FOREIGN PATENT DOCUMENTS

| | | | |
|---|---|---|---|
| 1455997 | 5/1969 | Fed. Rep. of Germany | 280/674 |
| 3018172 | 11/1981 | Fed. Rep. of Germany | |
| 8206319 | 11/1984 | Sweden | |
| 603831 | 6/1948 | United Kingdom | 280/674 |

Primary Examiner—Joseph F. Peters, Jr.
Assistant Examiner—Kenneth R. Rice
Attorney, Agent, or Firm—Eugene E. Renz, Jr.

[57] ABSTRACT

The invention pertains to a hub bearing unit for vehicles, trailers and the like, which unit comprises an inner race ring, an outer race ring (1) and rolling bodies disposed therebetween, whereby the inner and the outer race ring (1) respectively are mounted to the wheel and to the vehicle. The invention is characterized by a ball joint (7) which cooperates with the suspension attachment (3) of the vehicle and is arranged directly onto or in the outer race ring (1).

4 Claims, 4 Drawing Figures

HUB BEARING UNIT HAVING A BALL JOINT

FIELD OF THE INVENTION

The present invention refers to a hub bearing unit intended for mounting of driven or non-driven wheels on vehicles, trailers or similar devices.

BACKGROUND OF THE INVENTION

Hub bearing units of this type are well known. These bearing units replace the shaft and bearing for supporting the vehicle wheels. The units, which incorporate rolling bodies and thus in practice are bearings, are mounted to the rotating portion of the units. Units of the type in question are described in DE-A-No. 3,018,172.

In the above mentioned German patent, a unit for both driven and non-driven wheels is shown. The unit has two rows of balls which have a common outer race ring with a flange for the attachment of the unit to the vehicle. The flange is connected to the vehicle via a steering knuckle housing 12. This steering knuckle housing, which in the present case is moulded, in turn supports two ball joints 13 and 14, which make it possible to rotate the unit about the so-called "King pin"-inclination.

The arrangement with the steering knuckle housing according to the above patent requires a large amount of space. The distance from the bearing to the king pin shaft is very big. Recently, it has been tried to make the units more compact than what is shown in the above patent. The spindle housing has also been made of stamped sheet metal. An example of such an embodiment is shown in SE-8206319-9.

SUMMARY OF THE INVENTION

The problem of the earlier big and space requiring hub bearing units has, according to the present invention, been solved. The invention provided a very compact and easily mountable hub bearing unit for vehicles, trailers and the like incorporating an inner race ring with means for mounting a wheel, an outer race ring with means for mounting the unit to the vehicle, the trailer or the like and rolling bodies disposed between the outer race ring and the inner race ring. The hub bearing unit is characterized by a ball joint, which cooperates with the suspension attachment of the vehicle, arranged directly onto or in the outer race ring.

The device for mounting the units is preferably a flange on the outer race ring into which the ball joint can be screwed. The ball joint can also be fixed to the outer race ring by means of a retainer which is screwed to each side of the outer race ring.

The ball of the ball joint can either be turned away from the outer race ring or in against it. In the latter case, the seat for the ball is preferably arranged in or on the very outer race ring.

The present invention has provided a particularly simple and compact means to reduce the axial space between the bearing and the ball joint to null. A favourable location of the swinging axle in relation to the bearing is thereby obtained.

DESCRIPTION OF THE DRAWINGS

The invention, will hereinafter be further described with reference to the accompanying drawings, in which.

DESCRIPTION OF THE PREFERRED EMBODIMENTS

Figure 1:
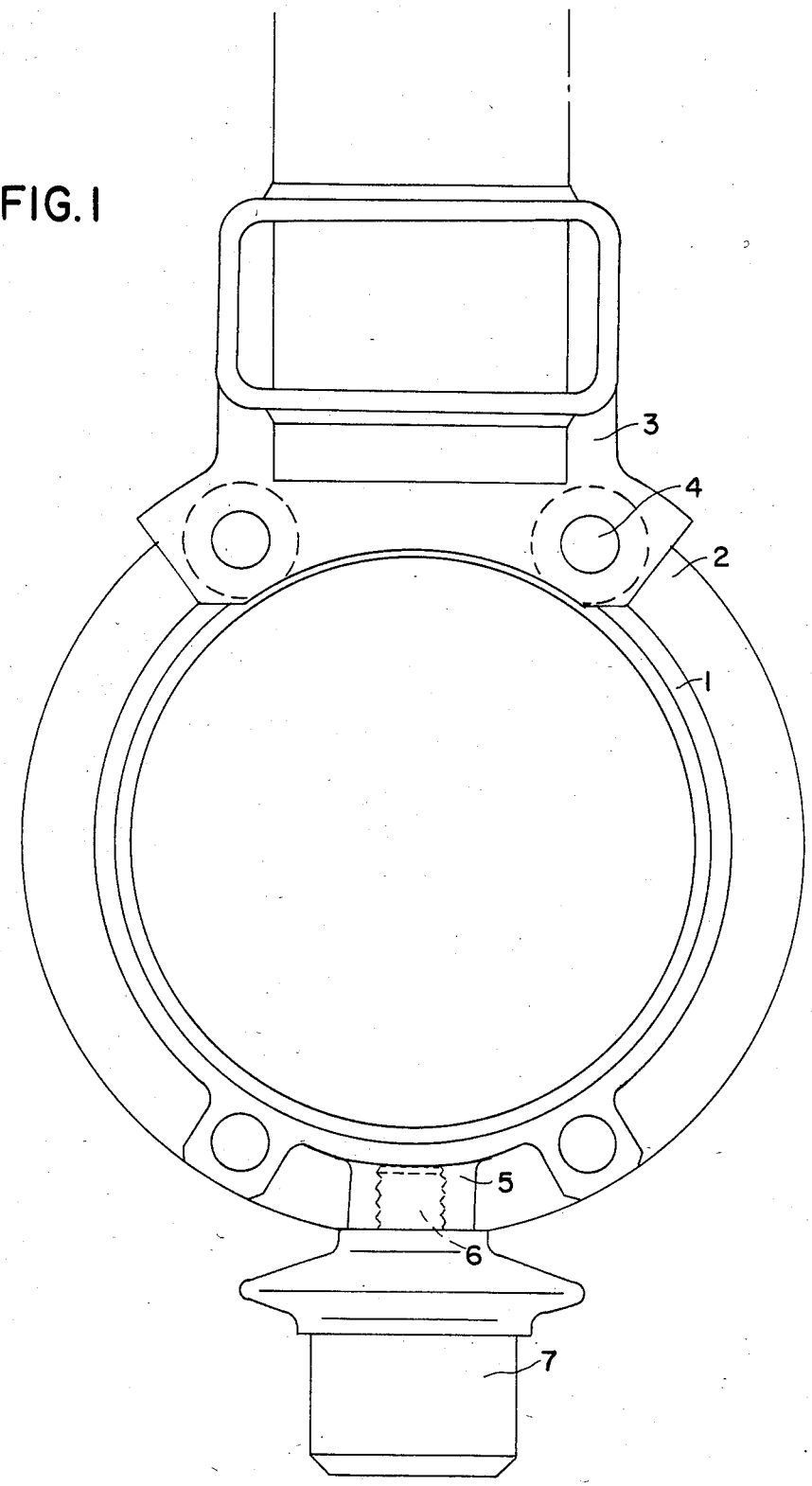
FIG. 1 shows a hub bearing unit according to the invention with a ball joint screwed thereinto.

FIG. 1 shows a hub bearing unit according to the invention in which only the outer race ring 1 has been shown and where the inner race ring and the rolling bodies have been omitted. On the outer race ring 1 there is a flange 2. On this flange 2 there are provided lugs and through holes for bolts. A fitting device 3 for the spring strut is fitted to bolts 4 in the bolt holes.

On the lower side of the flange there is provided a further lug 5. This is provided with internal threads 6 and the ball joint 7 is screwed into these threads. The seat for the ball, which is fitted to the suspension attachment of the vehicle has, for the sake of clarity, been omitted from the figure.

Figure 2:
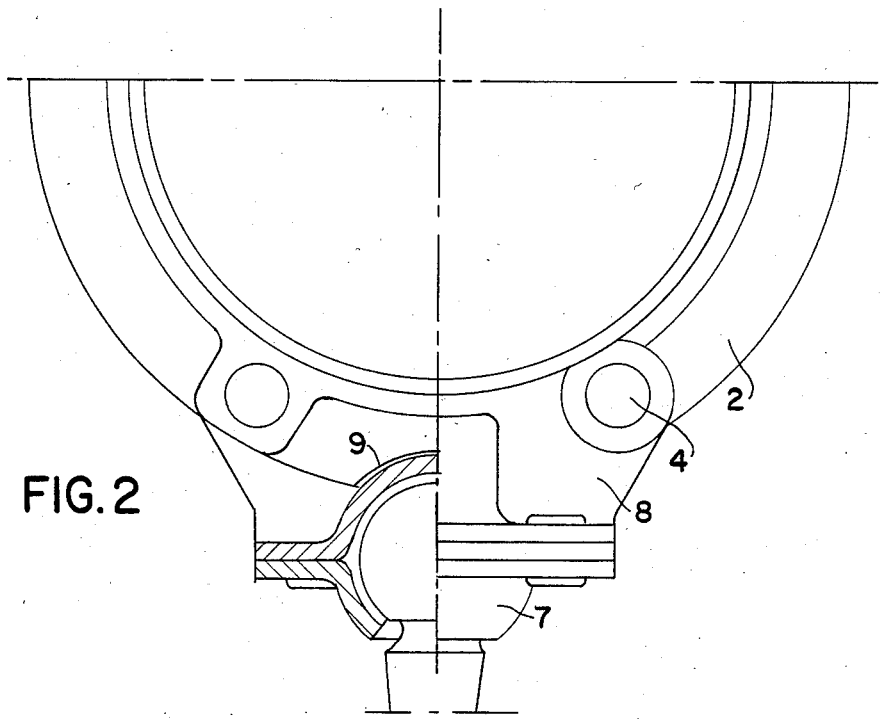
FIG. 2 shows a hub bearing unit with a ball joint in which the ball is facing the outer race ring and where the ball joint is fitted to the outer race ring by means of a retainer.
Figure 3:
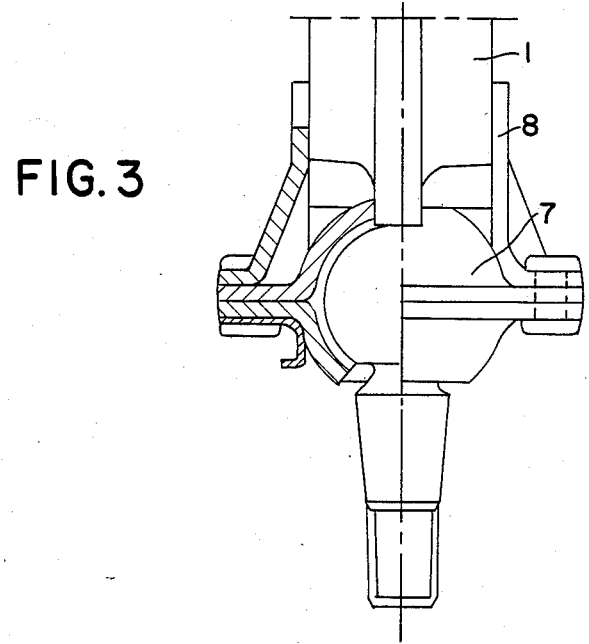
FIG. 3 shows the hub bearing unit of FIG. 2 as seen from the side.

FIG. 2 shows the lower part of a hub bearing unit similar to that of FIG. 1 but with the difference that the ball joint 7 has been fitted in a reverse manner by a retainer 8 and bolts 4. To save space, a recess 9 has been made in the flange for the ball joint. The retainer 8, which forms a fixed portion of the joint, has been attached to the outer race ring 1 on both sides thereof as shown in FIG. 3, whereby a safe attachment has been obtained.

Figure 4:
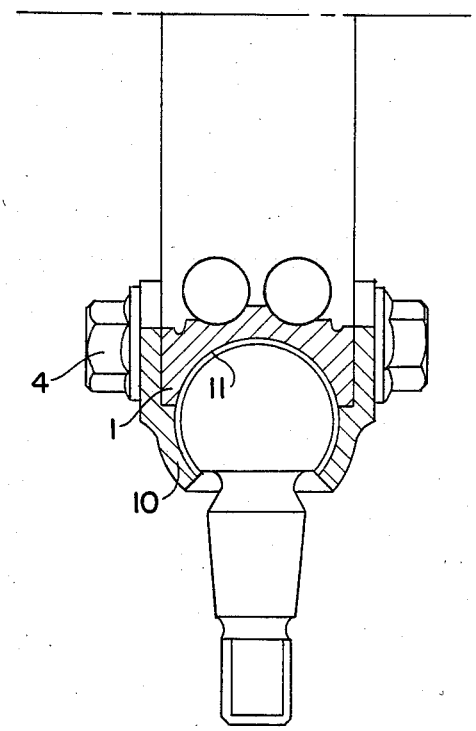
FIG. 4 shows a hub bearing unit in which the seat for the ball is shaped in the outer race ring.

FIG. 4 shows a section through a hub bearing unit according to the invention, wherein the lower seat 10 of the joint, which is formed as a retainer, is connected to the outer race ring by bolts 4 and the upper seat portion 11 for the ball is arranged directly in the outer race ring 1. The sealing arrangements have been omitted.

The invention is not limited to the embodiments shown but can be varied in different manners within the scope of the claims.

I claim:

1. A hub bearing assembly for a vehicle comprising inner and outer spaced ring members defining an annular space therebetween for a plurality of rolling elements, said inner ring having means for mounting a wheel of a vehicle, and said outer ring having means for mounting the hub bearing unit to the vehicle including means mounting said ball joint directly to said outer ring to form an integral unit for quick and easy assembly and disassembly of the hub bearing and ball joint as a unit.

2. A hub bearing assembly as claimed in claim 1 including a radially outwardly directed circumferentially extending flange projecting from said outer ring and an internally threaded lug on said flange, said ball joint having a threaded portion engageable in the lug to secure the ball joint and form an integral unit therewith.

3. A hub bearing assembly for a vehicle comprising inner and outer spaced ring members defining an annular space therebetween for a plurality of rolling elements, said inner ring having means for mounting a wheel of a vehicle, and said outer ring having means for mounting the hub bearing unit to the vehicle including a ball joint housing and means mounting said ball joint housing directly to said outer ring to form an integral unit for quick and easy assembly and disassembly of the hub bearing and ball joint as a unit, said ball joint housing connected by bolt means to opposite axial end faces of a circumferentially extending radially outwardly projecting flange formed integrally with the outer ring.

4. A hub bearing assembly for a vehicle comprising inner and outer spaced ring members defining an annular space therebetween for a plurality of rolling elements, said inner ring having means for mounting a wheel of a vehicle, and said outer ring having means for mounting the hub bearing unit to the vehicle including means mounting said ball joint directly to said outer ring to form an integral unit for quick and easy assembly and disassembly of the hub bearing and ball joint as a unit, said mounting means including means defining an arcuate recess in the outer ring defining a seat for the ball member of said ball joint and a retainer forming the lower seat for the ball member secured directly to said opposing axial end faces of said outer ring.

* * * * *